Patented Oct. 4, 1932

1,880,441

UNITED STATES PATENT OFFICE

RUDOLF M. HEIDENREICH AND PAUL TUST, OF LEVERKUSEN-ON-THE-RHINE, GERMANY, ASSIGNORS TO GENERAL ANILINE WORKS, INC., OF NEW YORK, N. Y., A CORPORATION OF DELAWARE

PHENANTHRIDONE AND PROCESS OF MAKING SAME

No Drawing. Application filed February 25, 1930, Serial No. 431,331, and in Germany March 1, 1929.

The present invention relates to a process of preparing phenanthridones and to new products obtainable thereby.

In accordance with the invention phenanthridone, and derivatives or substitution products thereof, which have been hitherto unobtainable or only obtainable with great difficulty, can be produced readily and in very good yield. Our new process is carried out by treating fluorenone or a substitution product or a derivative thereof with hydrazoic acid, in the presence of strong sulfuric acid, sulfuric acid monohydrate or weak fuming sulfuric acid. For example, the reaction can be carried out as follows: Fluorenone or a derivative thereof is dissolved or suspended in concentrated sulfuric acid and, while stirring, a solution of hydrazoic acid in a solvent which is inert to hydrazoic acid, (for example benzene, toluene, xylenes, chlorobenzene, etc.) is gradually added. The corresponding phenanthridone is formed with brisk evolution of nitrogen, and by pouring the sulfuric acid solution into water, it separates and can easily be isolated in the usual manner.

The reaction already occurs at low temperatures, for example, at 0° C., the upper limit being that at which thermal decomposition of the hydrazoic acid occurs.

Instead of fluorenone itself fluorenones which are substituted by monovalent substituents, such as halogen atoms, the nitro-, hydroxy-, carboxylic acid group or the like, can be employed as starting materials, whereby the corresponding substituted phenanthridones are formed. Also analogues of fluorenone, such as benzofluorenones, are operable, yielding with hydrazoic acid the corresponding analogues of phenanthridone.

The course of the reaction can probably be explained on the hypothesis of an intermediate formation of a fluorenone oxime, which by enlargement of the ring after the manner of the Beckmann transformation rearranges itself to the phenanthridone:

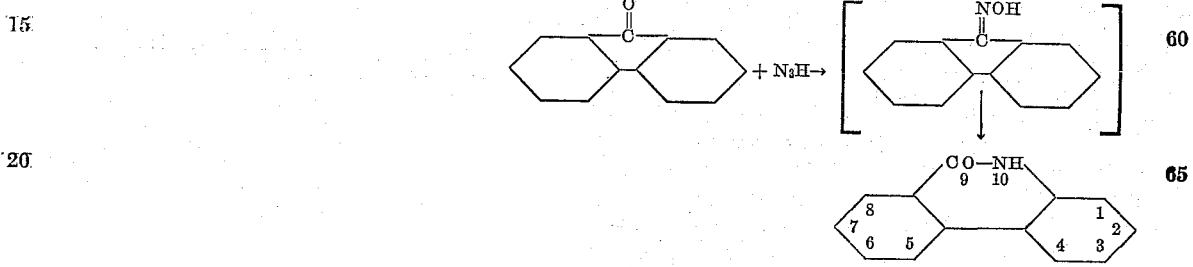

The phenanthridones thus obtainable form nearly colorless to red crystals, soluble in strong sulfuric acid to a nearly colorless to weakly yellow to greenish yellow solution and difficultly soluble in the usual organic solvents. They are valuable intermediate products for the manufacture of dyestuffs and pharmaceutical products.

The invention is illustrated by the following examples without being restricted therto:

*Example 1.*—36 grams of fluorenone are dissolved in 120 cc. of concentrated sulfuric acid, covered with 150 cc. of benzene and, while stirring, 150 cc. of an approximately twice normal solution of hydrazoic acid in benzene is added drop by drop. The reaction commences at room temperature with brisk evolution of nitrogen, and care is taken by cooling, if necessary, that the temperature of the reaction mixture does not exceed 30–35° C., since otherwise the hydrazoic acid is decomposed without taking part in the reaction. The total evolution of nitrogen amounts to 4.5 liters. The reaction is complete after one or two hours. The sulfuric acid containing the phenanthridone is poured on ice, the separated phenanthridone is filtered, and, if desired, crystallized from nitrobenzene, from which it is obtained in long colorless needles. The yield amounts to about 93% of the theoretical.

*Example 2.*—In a manner similar to that given in Example 1, 16.9 grams of 2.7-dibromofluorenone (obtainable according to Goldschmidt, Monatshefte der Chemie vol 16, page 812) are dissolved in 850 cc. of concentrated sulfuric acid, covered with 200 cc. of benzene, thereafter 50 cc. of a twice normal benzene solution of hydrazoic acid are added. The 2.7-dibromophenanthridone, which was hitherto unknown, is thus obtained in a yield of more than 90% of the theoretical; it crystallizes from nitrobenzene in nearly colorless needles and gives a colorless solution in concentrated sulfuric acid. On the copper block it melts at about 313° C. (uncorr.)

*Example 3.*—22.4 grams of 2-nitrofluorenone (Diels, Berichte der deutschen Chemischen Gesellschaft, vol. 34, page 1764) are dissolved in 120 cc. of concentrated sulfuric acid, covered with 240 cc. of benzene and, at 25-30° C., 100 cc. of a twice normal solution of hydrazoic acid in benzene are then slowly added. After one to two hours the reaction mixture is worked up in the manner described in Example 1. The nitrophenanthridone, obtained in a yield of 94% of the theoretical (crystallizing from nitrobenzene in small greenish yellow needles), melts on the block at about 343° C. (uncorr.) and dissolves in concentrated sulfuric acid to an almost colorless solution. On oxidation with potassium permanganate, it yields phthalic acid, for which reason it must be considered to be the 2-nitro-phenanthridone.

*Example 4.*—A solution of 19.2 grams of the violet 2-amino-fluorenone in 150 cc. of concentrated sulfuric acid, which is covered with 150 cc. of benzene is brought into reaction with 100 cc. of a twice normal solution of hydrazoic acid in benzene. The yield of 2-amino-phenanthridone formed in the reaction amounts to 94% of the theoretical; it crystallizes from aniline in small colorless needles, melting at 285-286° C. (uncorr.) and dissolves in concentrated sulfuric acid to a colorless solution.

We claim:—

1. Process which comprises reacting upon a fluorenone with hydrazoic acid in the presence of a compound of the group consisting of strong sulfuric acid, sulfuric acid monohydrate and weak fuming sulfuric acid at a temperature below that at which thermal decomposition of the hydrazoic acid occurs.

2. Process which comprises dissolving a fluorenone in a compound of the group consisting of strong sulfuric acid, sulfuric acid monohydrate and weak fuming sulfuric acid and causing a solution of hydrazoic acid in an inert solvent to run in slowly at a temperature below that at which thermal decomposition of the hydrazoic acid occurs.

3. Process which comprises dissolving a compound of the probable formula:

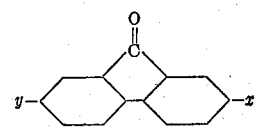

wherein $x$ means the amino group and $y$ stands for hydrogen, or $x$ and $y$ each stand for bromine atoms in concentrated sulfuric acid and causing a solution of hydrazoic acid in benzene to run in slowly at a temperature below that at which thermal decomposition of the hydrazoic acid occurs.

4. The products of the probable formula:

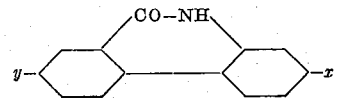

wherein $x$ means the amino group and $y$ stands for hydrogen, or $x$ and $y$ each stand for bromine atoms, said products forming nearly colorless needles soluble in strong sulfuric acid nearly without any coloration.

In testimony whereof, we affix our signatures.

RUDOLF M. HEIDENREICH.
PAUL TUST.